(12) United States Patent
Symons (10) Patent No.: US 8,535,583 B2
(45) Date of Patent: Sep. 17, 2013

(54) HYDRAULIC BINDER PRODUCT (75) Inventor: Michael Windsor Symons, Pretoria (ZA)

(73) Assignee: Tower Technology Holdings (Pty) Ltd., Pretoria (ZA)

( * ) Notice: Subject to any disclaimer, the term of this patent is extended or adjusted under 35 U.S.C. 154(b) by 1323 days.

(21) Appl. No.: 11/572,767

(22) PCT Filed: Jul. 27, 2005

(86) PCT No.: PCT/ZA2005/000111
§ 371 (c)(1),
(2), (4) Date: Jan. 26, 2007

(87) PCT Pub. No.: WO2006/012651
PCT Pub. Date: Feb. 2, 2006

(65) Prior Publication Data
US 2008/0060546 A1 Mar. 13, 2008

(30) Foreign Application Priority Data

| Jul. 27, 2004 | (ZA) | 2004/0591 |
| Jul. 27, 2004 | (ZA) | 2004/0593 |
| Jul. 27, 2004 | (ZA) | 2004/0991 |
| Jul. 27, 2004 | (ZA) | 2004/1123 |
| Sep. 9, 2004 | (ZA) | 2004/7197 |
| Sep. 9, 2004 | (ZA) | 2004/7198 |
| Jan. 27, 2005 | (ZA) | 2005/0805 |

(51) Int. Cl.
*B29C 43/22* (2006.01)

(52) U.S. Cl.
USPC .......... 264/45.8; 264/328.18; 264/328.6; 264/46.2; 264/46.3; 264/45.9; 264/333; 264/46.1; 264/663; 264/77; 264/297.4; 264/328.1; 264/3.2; 264/555; 264/556; 264/76; 264/175; 264/1.29; 264/3.3; 264/433; 264/452; 264/464; 264/37.26; 264/37.32; 264/623; 264/638; 264/75; 264/514; 264/539; 264/540; 264/176.1; 264/241

(58) Field of Classification Search
USPC .......... 264/45.8, 45.1, 328.18, 333, 426, 264/36.2, 915, 228, 297.9, 36.18, 328.6, 264/46.2, 46.3, 45.9, 46.1, 663, 77, 297.2, 264/297.4, 328.1, 3.2, 555, 556, 172.19, 264/173.1, 76, 175, 1.29, 3.3, 433, 452, 464, 264/37.26, 37.32, 623, 638, 75, 514, 539, 264/540, 176.1, 241; 425/205; 405/113; 156/39, 346
See application file for complete search history.

(56) References Cited

U.S. PATENT DOCUMENTS 2,236,251 A * 3/1941 Scripture, Jr. .......... 106/725
3,451,842 A * 6/1969 Wikne et al. .......... 521/55

(Continued)

FOREIGN PATENT DOCUMENTS

| CN | 1091485 C | 9/2002 |
| JP | 09295844 | * 11/1997 |

(Continued)

Primary Examiner — Jeffrey Wollschlager
Assistant Examiner — Stella Yi
(74) Attorney, Agent, or Firm — Yancy IP Law, PLLC (57) ABSTRACT The invention relates to a hydraulic binder product [12, 10] which includes a mixture of a hydraulic binder [38, 202], a polyvinyl alcohol [14, 204] and a gelling agent [54] which reacts with the polyvinyl alcohol and a method [8] of producing same.

10 Claims, 2 Drawing Sheets

(56) References Cited

U.S. PATENT DOCUMENTS

| | | | |
|---|---|---|---|
| 3,582,411 A * | 6/1971 | Brockbank et al. | 149/2 |
| 4,094,694 A | 6/1978 | Long et al. | |
| 4,436,429 A * | 3/1984 | Strong et al. | 366/2 |
| 5,234,968 A | 8/1993 | Debus et al. | |
| 5,850,880 A | 12/1998 | Moran et al. | |
| 2001/0001218 A1 * | 5/2001 | Luongo | 264/42 |

FOREIGN PATENT DOCUMENTS

| | | |
|---|---|---|
| JP | 2000302508 A | 10/2000 |
| JP | 2001114543 A | 4/2001 |
| WO | 0114284 A1 | 3/2001 |
| WO | 0145932 A1 | 6/2001 |
| WO | 0170647 A1 | 9/2001 |
| WO | 02081400 A1 | 10/2002 |

* cited by examiner

FIGURE 1

HYDRAULIC BINDER PRODUCT

BACKGROUND OF THE INVENTION

This invention relates to a hydraulic binder product and a method of manufacturing the product which can be used in various applications such as acoustic, thermal insulation and fire protection panels in buildings, fire resistant coatings on substrates or structures and in the binding or sealing of earthworks or ore bodies.

Gypsum boards used for wall and ceiling boards are manufactured by pouring a slurry of gypsum in water, often with other additives, onto a moving sheet of specially manufactured paper. The slurry is leveled either before or after being overlaid with another sheet of paper which is then side wrapped whereafter the gypsum is dried. The disadvantage is the cost of the paper and the cost of removing the considerable quantities of water necessary for the slurry consistency. Other gypsum wall boards without paper liners, are manufactured, some by adding a cellulous fibre to the gypsum, to which is added water, and which is then pressed, usually between double belt presses.

Asbestos fibre cement building boards were previously manufactured by the Hatcheck method in which asbestos fibre was suspended in an aqueous suspension of cement and silica particles. The cement and silica coated asbestos fibre was then removed by dewatering sheets from the bath and placed on a dewatering table. Successive sheets were then pressed together to achieve the required thickness, and after a dwell time of some fourteen hours, the boards were then autoclaved. Shapes were made by draping the dewatered sheets over shape formers such as corrugated metal templates. Subsequent to the identification of the health hazards of asbestos fibre, these have been largely replaced by cellulous fibre from pulp, sometimes mixed with synthetic fibres. An alternative cementitious building board is made from cement-bound wood chips which are pressed at high pressure, clamped and then autoclaved.

The disadvantage of these methods is either the expense of the equipment or the slow processes involved.

It is also known to make foamed products from hydraulic binders such as gypsum and international publication number WO 99/28266 teaches a method of making a composite product by mixing a hydraulic binder, finely divided lignocellulosic fibres and water, optionally containing a polyvinyl alcohol to form a paste, introducing a foam generated from a polyvinyl alcohol into the paste and mixing to form a foamed product, forming the foamed product into a desired shape and allowing the hydraulic binder to set to form a composite product.

International publication number WO 01/14284 described a method of making a composite product by mixing a hydraulic binder and water in an amount sufficient to form a paste, introducing a foam into the paste, the foam being generated from a mixture of polyvinyl alcohol solution and a second hydrophilic polymer, mixing to form a foamed product, forming the foamed product into a desired shape and allowing the hydraulic binder to set to form the composite product.

It is important that the density of the binder products be uniform during manufacturing. In certain applications it is desirable that the binder product be of a specific shape, rigidity or of varying thickness. In order to manufacture certain products or in order to use the binder product for certain applications it is important that the product is tack-free or non-sticky during manufacture.

SUMMARY OF THE INVENTION

This invention aims to provide an alternative method of manufacturing a hydraulic binder product and various hydraulic binder products produced by way of the method for different applications.

The invention provides a hydraulic binder product which includes a mixture of a hydraulic binder, a polyvinyl alcohol and a gelling agent which reacts with the polyvinyl alcohol.

The hydraulic binder is preferably selected from any one or combination of the alpha or beta hemihydrate of calcium sulphate, Portland cement or calcium aluminates.

The polyvinyl alcohol may be in the form of a 2% to 8% solution of a 75% to 90% hydrolysed or saponified polyvinyl alcohol or a 97% to 99.5% hydrolysed or saponified polyvinyl alcohol. The polyvinyl alcohol may have a molecular weight of between 105 000 and 175 000 g/mol. Preferably the polyvinyl alcohol has a molecular weight of between 110 000 and 160 000 g/mol. The polyvinyl alcohol may be present in the product at concentrations of between 4% and 20% in water.

The gelling agent preferably includes borax.

The binder product may include an organic component. Preferably the organic component is in the form of a lipid. The lipid may be of plant origin. The binder product may include a solvent.

The binder product may include reinforcing members. The reinforcing members may be selected from any one or combination of rock wool, slag wool, mineral wool or glass wool.

The binder product may include a plasticiser and an extender. The extender may include silica particles, a micro cellular filler or exfoliated vermiculite.

The binder product may include a retarder, or an accelerator for the hydraulic binder. The binder product may include a thermoplastic polymer emulsion. The emulsion may have a glass transition temperature of between 0 and 50° C.

The binder product may be unfoamed or foamed, and extruded, calendered, cast or sprayed.

The invention also provides a method of manufacturing a hydraulic binder product of the aforesaid kind which includes the step of mixing a binder slurry with an aqueous solution in a blender.

The aqueous solution may be unfoamed or foamed.

The method may include the step of foaming the aqueous solution in a sparge unit.

BRIEF DESCRIPTION OF THE DRAWINGS

The invention is further described by way of examples with reference to the accompanying drawings in which.

DESCRIPTION OF PREFERRED EMBODIMENTS

Figure 1:
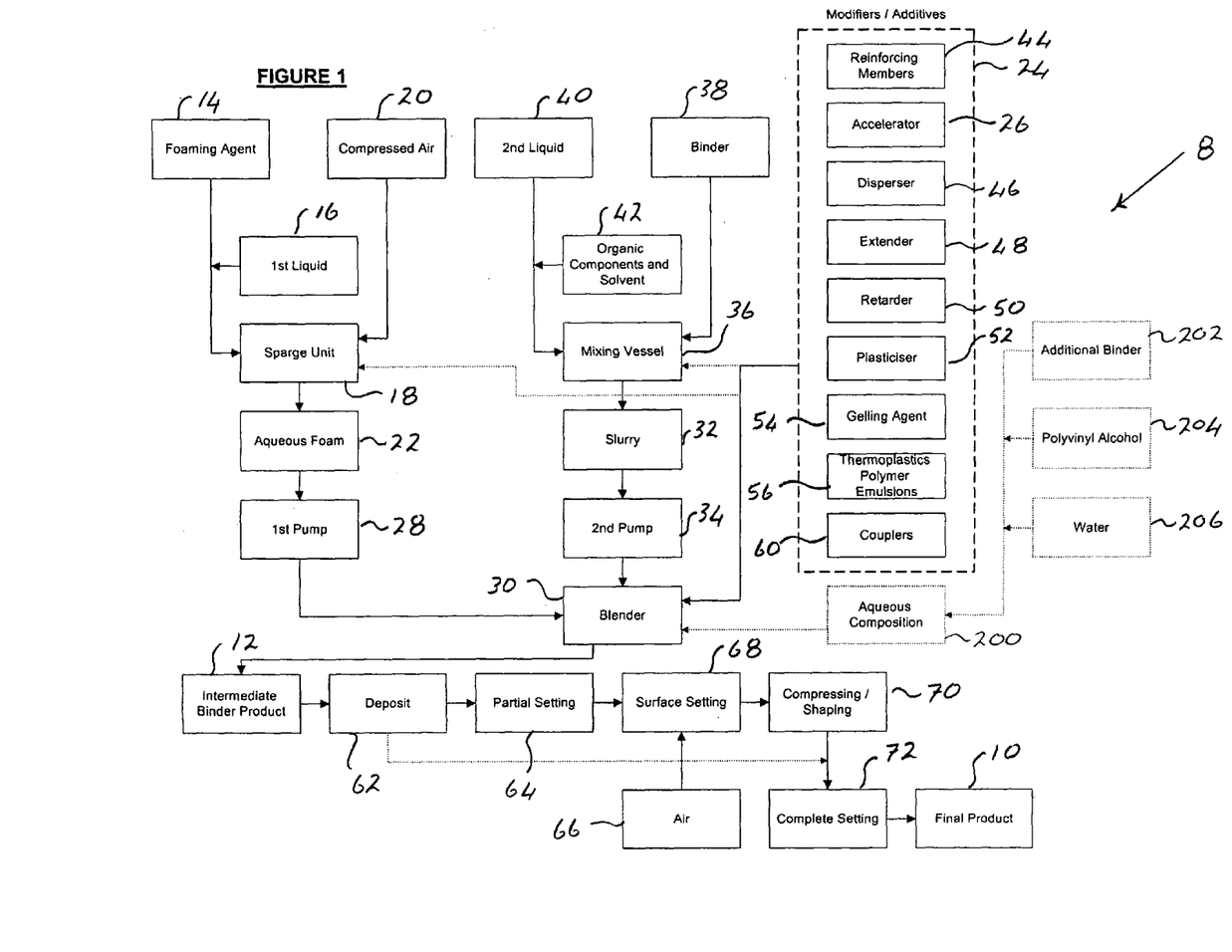
FIG. 1 is a schematic representation of a method of manufacturing a hydraulic binder product according to the invention.

FIG. 1 illustrates a method 8 of producing a final product 10 which is made from a foamed, intermediate binder product 12. The intermediate product 12 is manufactured by mixing a foaming agent 14 with a first liquid 16, such as water. The foaming agent 14 and water 16 are introduced into a sparge unit 18. Compressed air 20 is simultaneously introduced into the sparge unit 18 which results in an aqueous foam 22 exiting the sparge unit 18.

The foaming agent 14 and water 16 are pumped into the sparge unit 18 at a uniform, unvarying rate and the air 20 is introduced into the sparge unit 18 at a constant static pressure and volume. The rate of delivery of the foam agent 14 and water 16 and the pressure thereof is balanced with the pressure of the air 20 to ensure that the foam 22 is air saturated without any excess of unmixed air. An additive 24 such as an accelerator 26 can be introduced into the sparge unit 18 simultaneously with the foaming agent 14 in order for the accelerator 26 to become mixed into the aqueous foam 22.

The aqueous foam 22 is delivered by way of a first pump 28 to a blender 30. The foam 22 is delivered to the blender 30 at a constant rate and density. Simultaneously with the aqueous foam 22 a binder slurry 32 is introduced into the blender 30 at a constant flow rate, pressure and density by way of a second pump 34.

The slurry 32 exits from a mixing vessel 36 wherein a hydraulic binder 38, second liquid 40 such as water and an organic component and solvent 42 are fed. The component and solvent 42 are optional components and the binder 38, water 40, component and solvent 42 (if present) are mixed in the vessel 36.

Various additives 24 or modifiers are delivered to the blender 30 depending on the required properties of the intermediate product 12. Alternatively, as is shown in dotted lines the additives 24 can be introduced to the slurry 32 in the vessel 36 or to the foam 22 through the sparge unit 18. The additives 24 can include any one or combination of reinforcing members 44, the accelerator 26, a disperser 46, an extender 48, a retarder 50, a plasticiser 52, a gelling agent 54, a thermoplastics polymer emulsion 56 and couplers 58.

The intermediate product 12 is deposited in a step 62 on an appropriate surface such as for example a mould, a cast, a calender roll press, a rotor press, an extrusion press, a continuous flat bed double belt press or is alternatively sprayed onto a required surface.

In a step 64 the intermediate product 12 is allowed to partially set and if required air 66 is blown onto a surface of the partially setting product of step 64 in a step 68 in order to accelerate surface setting of the intermediate product 12. In a step 70 the intermediate product 12 is compressed or shaped in any appropriate manner including pressing. The intermediate product 12 is allowed to completely set in a step 72 which results in the final product 10. In applications of the intermediate product 12 where the intermediate product 12 is deposited into a mould, a cast, or sprayed onto a surface steps 64, 68 and 70 are omitted and the deposited intermediate product 12 is allowed to completely set in the step 72 in order to form the final product 10.

The foaming agent 14 may be any suitable foaming agent and in this example is a suitable polyvinyl alcohol. For example, the foam 22 may be generated from a 2% to 8% inclusive solution of a 75% to 90% hydrolysed polyvinyl alcohol, or a 97 to 99.5% hydrolysed polyvinyl alcohol to give a foam density in the range of from 40 to 120 g/l.

The polyvinyl alcohol foaming agent 14 is a thermoplastic water soluble polymer, is very effective at low concentrations, has easily controlled viscosity, can be augmented by other hydrophilic polymers, is a colloidal solution with good film forming property, is non hygroscopic, is biodegradable, is resistant to solvents, fats and oils as well as to water absorption, has good mechanical properties, is non toxic, provides a good barrier to aromas and can be used at low concentrations compared to other hydrophilic polymers.

The polyvinyl alcohol foaming agent 14 can be used as a reversible binder and its behaviour as a thermoplastic is critical at temperatures in the range of 120 to 190° C. The degree of subsequent cold water solubility or the temperature of hot water solubility of the polyvinyl alcohol foaming agent 14 is influenced by the time, the temperature, the pressure used in the process and the molecular weight and degree of hydrolysis of the chosen polyvinyl alcohol or its chemical modification. The higher the molecular weight and lower the degree of hydrolysis the lower the rate of dissolution. By correct choice of polymer and process insolubility in water of up to 80° C. is possible.

Suitable polyvinyl alcohol foaming agents 14 are those by Clariant as depicted in the following table:

|  |  | Viscosity[1] mPa-s |  | Degree of hydrolysis (saponification) mol % |  | Ester value[2] mg KOH/g |  | Residual acetyl content Wt % |  | Max ash[3] |
|---|---|---|---|---|---|---|---|---|---|---|
| Partially hydrolised grades. | Mowiol | 8-88 | 8 ±1.0 | 87.7 | ±1.0 | 140 | ±10 | 10.8 | ±0.8 | 0.5 |
|  | Mowiol | 18-88 | 18 ±1.5 | 87.7 | ±1.0 | 140 | ±10 | 10.8 | ±0.8 | 0.5 |
|  | Mowiol | 23-83 | 23 ±1.5 | 87.7 | ±1.0 | 140 | ±10 | 10.8 | ±0.8 | 0.5 |

Volatile matter (DIN 53 189): maximum 5% (after 3 h dry ng at 105° C.).
pH of a 4% solution in distilled water (DIN 19 260/61): 4.5-7 for partially and fully hydrolysed graded
Bulk density (DIN 53 468): approx 0.4-0.6 g cm³, depending on grade 4
[1]of a 4% aqueous solution at 20° C. (DIN 53 015)
[2](DIN 53 401)
[3]calculated as Na20

It is preferable to use those grades with a molecular weight in the range 60 000 to 160 000 g/mol. The decision is influenced by the binding property. The higher the molecular weight the greater the bond, but in addition, the higher the molecular weigh the lower the viscosity. The more fully hydrolysed grades are also characterized by a higher viscosity. The grade found to be most suitable because of viscosity solution concentrations in the range 3 to 10% is Mowiol 18/88 or 23/88 or 26/88 by Clariant.

| Suitable Grades by Clariant | | Code | Molecular Weight Mw (g/mol) | Degree of Polymerisation Pw |
|---|---|---|---|---|
| Partially hydrolysed grades of Polyvinyl | Mowiol | 18-88 | 130 000 | 2700 |

-continued

| Suitable Grades by Clariant | Code | | Molecular Weight Mw (g/mol) | Degree of Polymerisation Pw |
|---|---|---|---|---|
| Alcohol | | | | |
| | Mowiol | 23-88 | 150 000 | 3100 |
| | Mowiol | 26-88 | 160 000 | 3300 |
| Fully hydrolysed grades of Polyvinyl Alcohol | Mowiol | 20-98 | 125 000 | 2800 |

As a binder the polyvinyl alcohol foaming agent 14 is an excellent binder with good adhesive and film strength. The film has good tear strength as well as elongation at break. The partially hydrolysed grades have a higher elongation at break than the fully hydrolysed grades which are more rigid. This allows for choice depending on the application, such as resistance to shock. The film has high gas impermeability and resistance to organic solvents and yet still retains high moisture permeability. This is a unique benefit in the method of the invention where rapid drying is needed, and the aggregated material has a strong peripheral or surface film.

The different grades allow a wide spectrum of choice. For example the partially hydrolysed grades such as Mowiol 18/88, 23/88 and 26/88 by Clariant and G-types by Nippon Gohsei such as GH17 to GH22, have the property of good foaming capability. The polyvinyl alcohols have increasing tensile strength with increasing degree of polymerisation and molecular weight. The partially hydrolysed grades, at a given concentration in water, have a lower viscosity than the fully hydrolysed or saponified types. There is therefore an ideal molecular weight range at the acceptable concentration levels suitable for the invention. These are Mowiol grades 18/88, 23/88 and 26/88 by Clariant and the G-types GM14 and GH17 to GH22 by Nippon Gohsei and in the fully hydrolysed or saponified grades, Mowiol 20/98 by Clariant and the Gohsenol N-types NH18, NH20, NM14 and N300 by Nippon Gohsei with molecular weights in the range 125 000 to 160 000 g/mol and viscosities of a 4% solution at 20° C. in the range 16 to 30 mPa·s, with a degree of hydrolysis or saponification mol percent in the partially hydrolysed grades of between 86 and 88, an approximate ester value in mgKOH/g of 140±10 in the partially hydrolysed grades and in the fully hydrolysed grades, a degree of hydrolysis or saponification mol percent between 97 and 99 and an ester value of 20±5 mgKOH/g.

Solubility in water and rigidity increase with increasing saponification and molecular weight. The fully hydrolysed grades such as N300 by Gohsenol or 20/98 by Mowiol have a higher degree of water insolubility at room temperature and a higher capacity for gelation. Increasing drying temperature improves resistance to water solubility in both types but water proofing agents may also be used such as Glyoxal, Dimethylol Urea, or acids such as orthophosphoric acid or certain salts such as ammonium chloride or sodium/ammonium bichromate, these typically being added at 5% by mass on the polyvinyl alcohol. Adding Aldehyde and Ureaformaldehydes are other options. The polyvinyl alcohols have less tendency to putrefaction, decomposition or polymerisation than most other binders. Certain compounds can be used to inhibit gelation during storage or process until the required point in time. Examples are sorbic acid, rhodan salt or a higher alcohol. Preservatives to prevent attack by microorganisms such as sodium dehydroacetate, potassium sorbate or sodium pentachlorophenol are effective at levels of 0.01 to 0.1% by mass of the aqueous solution. Dissolution of the polyvinyl alcohol is best done by dispersion at room temperature and then increasing the heat of the mixture to 90 to 95° C. Complete dissolution then takes place within 10 to 20 minutes. This is particularly important in the case of the fully hydrolysed or saponified grades.

Considerations influencing the choice of the polyvinyl alcohol grade are the molecular mass, degree of polymerisation and viscosity of an acceptable concentration in water, the propensity to gel and the gelation characteristics thereof, the solubility thereof at room temperature in water, the drying temperature thereof, and the percentage concentration required and its temperature both in use and in drying.

The optimum molecular weights are between 100 000 and 175 000 more specifically between 110 000 and 160 000. The maximum concentration in water is approximately 20% and the normal minimum would be 4%. The fully hydrolysed or saponified grades may be superior in respect of solubility and the greater the drying temperature is the greater the insolubility in water.

For foamed product versions the partially hydrolysed polyvinyl alcohols of molecular weights in the range 120 000 to 170 000 are preferred and would be used in the proportion of 2.5 to 10% by mass of the solution an example being Mowiol 18/88 by Clariant. Where water resistant product versions are required, such as for earthwork or orebody sealing the fully hydrolysed polyvinyl alcohols such as Mowiol 20/98 by Clariant or Gohsenol N300 by Nippon Gohsei are preferred.

Figure 2:
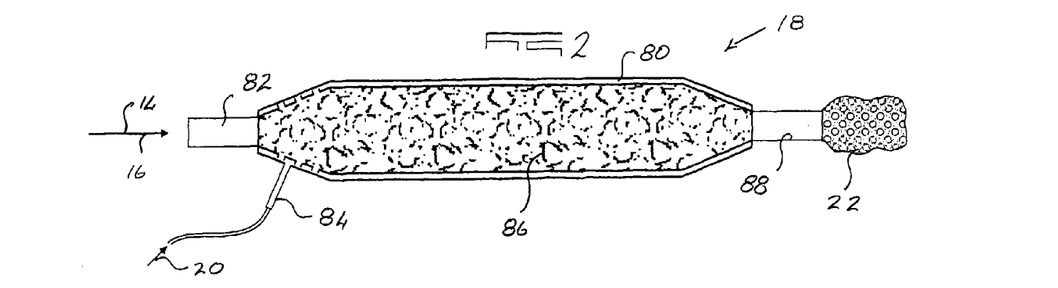
FIG. 2 is a schematic, cross-sectional side view of a sparge unit used in the method of FIG. 1.

The sparge unit 18 is shown in FIG. 2. The sparge unit 18 has an enclosed housing 80 with a first inlet 82 through which the foaming agent 14 and water 16 are introduced into the housing 80 and a second inlet 84 through which the compressed air 20 is introduced into the housing 80. The housing 80 is filled with finely divided thin strands 86 such as polymer cord or metal wool or particles, which forces passive air/liquid blending. In the sparge unit 18 the air 20, foaming agent 14 and water 16 are intimately blended and reblended until a saturated foam 22 emerges at a constant rate and density from an outlet 88 extending from the housing 80.

The strands 86 may be made from any suitable polymeric material, such as gut, nylon, polyolefin and similar. These strands 86 would be typically of a diameter of from 0.5 mm to 3 mm and more preferably in the range of 1 mm to 2 mm. The strand material is easily cleaned, corrosion resistant, non affected by the foam solution and should not rust.

The accelerator 26 is introduced into the housing 80 through the first inlet 82 and is mixed with the foaming agent 14, air 20 and water 16 inside the housing 80. Any other suitable additive 24 can be introduced to the foam 22 by feeding the relevant additive 24 into the sparge unit 18 through the first or second let 82, 84.

As the foaming agent 14, water 16, air 20 and optional additive 24 proceed from the inlet 82, 84 to the outlet 88 the air 20 is micronised further and further as it divides between the strands, until the solution can contain no further air 20 and the density reduction is at its theoretic maximum. This is typically in the range of 40 to 80 g/λ and most usually 50 g/λ. The pressure of the air 20 entering the sparge unit 18 is balanced with the hydraulic pressure of the foaming agent 14 and water 16. The volume of air 20 entering through the second inlet 84 is also synchronised in such a way that the foam 22 which exits through the outlet 88 contains no free air resulting in a continuous, even, homogenous flow of the foam 22.

The first pump 28 is in the form of a continuous, constant pressure, positive displacement pump which pumps the foam 22 into the blender 30.

Figure 3:
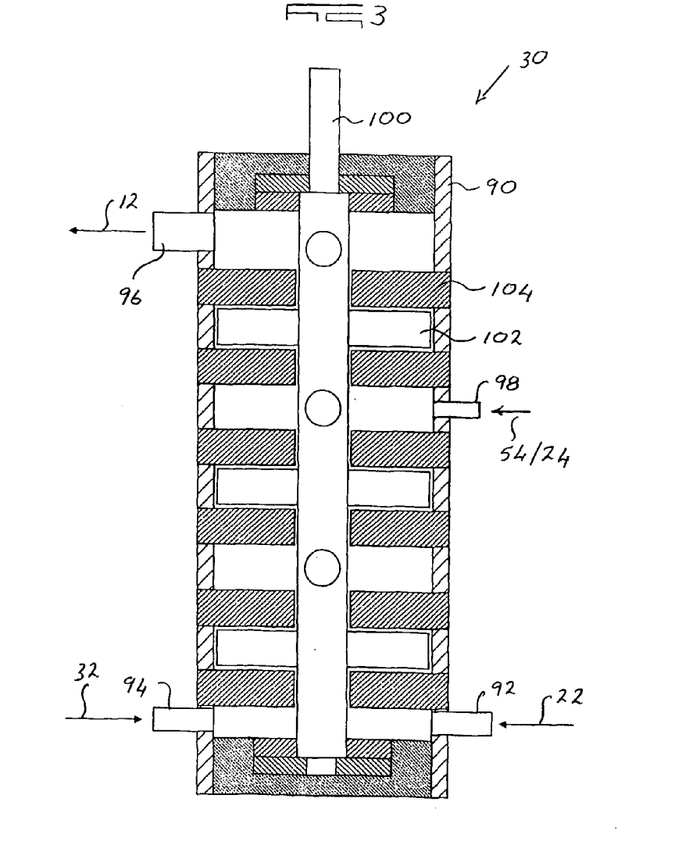
FIG. 3 is a sectioned side view of a blender used in the manufacturing of a foamed binder product of FIG. 1.

The blender 30 is shown in FIG. 3 and has an elongate, vertical container body 90. The body 90 is sealed and has a first lower inlet 92 as well as a second lower inlet 94 formed therein. An upper outlet 96 is formed in the body 90 and the outlet 96 is spaced from and above the first and second lower inlets 92, 94. If required an intermediate inlet 98 is formed in the body 90 between the first and second lower inlets 92, 94 and the outlet 96. The blender 30 has a shaft 100 which extends vertically into the body 90 and which can be driven in any appropriate manner. A plurality of spaced apart agitators or fins 102 extend radially from the shaft 100 inside the body 90. A plurality of blade formations 104 extend from the body 90 towards the shaft 100 and the fins 102 and blades 104 are positioned so that the fins 102 are movable relatively to and freely pass between the blades 104.

The foam 22 is pumped into the blender 30 by the first pump 28 through the first lower inlet 92 and the slurry 32 is pumped into the blender 30 by the second pump 34 through the second lower inlet 94.

The second pump 34 is similar to the first pump 28 and the foam 22 and slurry 32 are pumped into the blender 30 without pulsing and continuously to ensure an accurate metering of and a constant flow of the foam 22 and slurry 32 into the blender 30.

The shaft 100 is rotated at between 750 and 2000 rpm. As the foam 22 and slurry 32 are pumped into the blender 30 the mixture is agitated by the fins 102 and the combination of the fins 102 and blades 104 results in thorough mixing of the foam 22 and slurry 32. The mixed foam 22 and slurry 32 exits the blender 30 at the outlet 96 as the intermediate product 12.

The mixing action of the blender 30 results in the dispersion of the particles of the binder 38 to optimum particle size, intimate mixing of the foam 22 and slurry 32 and the further micronisation of the relevant composites.

Additional lower inlets (not shown) into the body 90 could be formed in the blender 30 through which water could be introduced into the blender 30 for water flushing between operations and for the introduction of additives 24. The intermediate inlet 98 is also used to introduce additives 24 (if required) into the blender 30.

The mixing vessel 36 from which the slurry 32 flows is in the form of a known mixer.

The binder 38 is in this example a hydraulic binder which is either the alpha or beta hemihydrate of calcium sulphate referred to as gypsums or alternatively Portland cement or calcium aluminates. A combination of any one of these binders can also be used.

Were Portland cement is used as a binder 38 and it is to be autoclave at temperatures of the order of 180° C. and at pressures of 12 to 14 bar using super heated steam, silica particles should be added to the mix as an extender 48 on a proportion by mass in the range 30 to 60% to 70 to 40% of Portland cement and the particle size being of equivalent blain or of the order of 300 mesh. During autoclaving tobomorite crystals are formed which lead to improved properties in Portland cement composites. Pozzolans such as granulated blast furnace slag or flyash can usefully be added as an extender 48 on the grounds of cost as well as improving the property of cement products by neutralising part of the calcium hydroxide to form calcium silicate hydrates which further reduce porosity.

The organic compound 42 is insoluble in water but is dispersed intimately in the mix water 40. Organic compounds 42 are included because they comprise of a "water hating" or hydrophobic component and a "water loving" or hydrophilic component and they perform the very special function of encapsulating the air bubbles, which also contain traces of an organic volatile in the introduced foam 22. In this way the compound 42 prevents coalescence of the air bubbles and stabilise the intermediate product 12. This propagates stability, much lower densities are obtainable, improves thermal insulation and acoustic properties, and ease of processing in the manufacturing sequences.

The compounds 42 also serve to minimise the water requirement in the slurry 32 and this is particularly true of Portland cement and depending upon the specific organic compound 42 used. The compounds 42 further adds synergistic binding as well as hydrophobic properties to the final product 10.

A solvent forms part of the compound 42 and is introduced to the slurry 32 in the mixing vessel 36. Solvents 42 of choice are petroleum hydrocarbons such as the aromatic hydrocarbons, examples being xylene, benzene, toluene or styrene monomer. Of these the most preferable is toluene, particularly because it is highly volatile in water vapour during the early stage of drying. Into the hydrocarbon solvent is preferably dissolved the organic compound which is a lipid or optionally the lipid may be used on its own. Lipids are triglycerides of plant or animal origin, preferably oils such as soya, sunflower, Rape seed (Canola), groundnut, linseed, or cashew nut at a preferred level of up to 10% by mass of the hydraulic binder, more preferably in the range 2 to 7%. The hydrocarbon solvent with solute, which is a lipid, is added to the slurry 32 at between 3 and 20 weight percent of the binder 38, more preferably between 3 and 15% more preferably between 3 and 8%.

Lipids occur in plants and animals as triglycerides of free fatty acids esterified to one molecule of glycerol. The fatty acids may be the same or different and may be saturated or unsaturated. Most usually water insoluble lipids contain 10 or more carbon atoms and many are unsaturated, usually monounsaturated i.e. containing only one unsaturated bond, or polyunsaturated, and which may be subsequently oxidized, potentially also serving as a binder. Examples of this phenomenon are drying linseed oils or acid oils that may be catalysed with heavy metal salts, used as a binder in window putty, and acid oils comprised of extracted fatty acids from plant oils used in paints as a constituent of the binder. In the context of this invention, lipids or their constituent fatty acids have a very special capability of forming a film on a water surface. These molecules contain a non-polar chain that does not have places for water to act as a solvent, and a polar end, that is easily surrounded by water. An assembly of these molecules on a surface of water is highly ordered, with the polar "head" groups or hydrophilic ends located on the surface of the water and the water insoluble or non-polar "tail" groups or hydrophobic ends aligned in the space above, forming a sheet. This is referred to as a lipid bi-layer which is especially significant in entrapping the aqueous structure of the hydraulic binder and it is this phenomenon that is so remarkable in an hydraulic binder foam because the gas bubbles which possibly containing some organic volatiles are encapsulated rather like micelles in thermoplastic polymer synthesis, entrapping the gas bubble, stabilising it and isolating it from the other bubbles maintaining a very stable foam, even one that has been subjected to considerable shear or mechanical force. In fact the bubbles when subjected to mechanical shear tend then to subdivide making smaller and smaller bubbles producing a foam that is very stable, fine cell, homogenous and easy to process. The lipid serves to contribute the further advantage of an auxiliary binder and hydrophobic agent. Lipids of animal source tend to be plastic or more gelatinous whereas the oils sourced from plants are the most suitable. Of these Rape seed oil or sunflower oil or their derived constituent fatty acids are particularly effective forming as they do a continuous and very thin sheet lipid bi-layer with the non polar "tail"

interface between the paste surface and the entrained gas bubbles. By acid oils is meant a plant oil in which are consistent fatty acids not esterified or in the triglyceride form, and which are also considered lipid components.

Refined oils of vegetable origin are non polar triglycerides. These oils are generally classified according to their fatty acid make ups. For example coconut oil and palm kernel oil are high in lauric acid and relatively lower in oleic and linoleic acids. Lauric acid has 12 carbon atoms in the chain and is also prevalent in milk. The higher the proportion of unsaturated fatty acids the higher the propensity of the oil to oxidise and "dry" making the oil useful in paints and coatings due to its capacity for binding. They are not as desirable for food and are often hydrogenated in order to saturate the carbon chain, improving stability on storage. Examples of Linolenic acid oils are linseed, soybean and canola among others. Soybean is the most widely produced vegetable oil in the world. Production in 1992 was 17 million metric tons. The following table illustrates the make up of the oils most freely available and suitable for the method of the invention.

| Typical Composition and Chemical Constance of Common Edible Oils | | | | | | |
|---|---|---|---|---|---|---|
| OIL TYPE | Palmitic | Stearic | Oleic | Linoleic | Linolenic | Iodine Value |
| CARBON ATOM: DOUBLE BONDS | 16:0 | 18:0 | 18:1 | 18:2 | 18:3 | |
| Canola Oil | 3.9 | 1.9 | 64.1 | 18.7 | 9.2 | 110-115 |
| Corn Oil | 12.2 | 2.2 | 27.5 | 57.0 | 0.9 | 110-128 |
| Linseed Oil | 4.8 | 4.7 | 19.9 | 15.9 | 52.7 | |
| Palm Oil | 45.1 | 4.7 | 38.8 | 9.4 | 0.3 | 45-56 |
| Soybean Oil | 11.0 | 4.0 | 23.4 | 53.2 | 7.8 | 125-138 |
| Sunflower Oil | 6.8 | 4.7 | 18.6 | 68.2 | 0.5 | 122-139 |

(Decimal denotes in unsaturation)

During the refining of vegetable oil, traces of derivatives of phosphatidic acid such as phosphatidylcholine, also called lecithin, are removed because they cause clouding as a result of their emulsifier or surfactant properties. This is because they contain a polar head and are natures surfactants or surface active agents. It has been found in the method of the invention that the presence of surfactants, detergents or emulsifiers destabilise the foam 22 by reducing surface energy and thereby propagating the draining of the continuous phase, which is water, in which is dispersed calcium sulphate hemihydrate particles. The phosphatide content of vegetable oils before de-gumming is of the order of 1 to 2%. De-gumming is generally achieved by adding small quantities of water to the oil followed by centrifugal separation. This removes from the oil those components i.e. the phospholipids, that have an affinity for water. Free fatty acids are removed by alkali refining. In this process an aqueous solution of caustic soda is added to the oil. The aqueous emulsion of soaps so formed from the free fatty acids settle at the bottom of the container and are drawn of. These are referred to as acid oils. The carboxylic acid group is undesirable due to its potential reactivity. Gums are removed by winterising or rapid chilling and filtering. For example linseed oil is winterised to remove traces of waxes that may interfere with its drying properties in paints vanishes and as a binder. Winterising of vegetable oils is conducted in order to ensure that they remain liquid at relatively low temperatures.

The non polar triglycerides in vegetable oils, with an iodine value in the range 125 to 145 or greater than 145, are referred to as drying oils which can serve the function of auxiliary binders as well as hydrophobic agents in the composite. Drying is a function of polymerisation and cross linking by oxidation. Induction is slow at first but is autocatalytic and rate of increase is steady, particularly in the presence of metal ions and at elevated temperatures. The process commences with the abstraction with a hydrogen ion by the interaction of oxygen and the olefin taking place, followed by the formation of hydroperoxides producing three possible peroxy radicals. The hydroperoxides start to decompose to form a high free radical concentration and the reaction then proceeds more rapidly with an increase in molecular weight. Oils from the linolenic fatty acid group such as linseed and soybean are the more unsaturated and therefore have a higher propensity to oxidize and bind.

The oils also have high hydrophobicity. For example a foam 22 of a density of 220 kg/m$^3$ and containing 7% by mass of sunflower oil when tested in a 98% relative humidity environment only absorbed 0.75% of water over a period of 200 hours of exposure and reached a maximum moisture percentage of 5% over 3 months.

However it is the stability of the foam 22 and the air cell size reduction that is the principle advantage of the oils in the aqueous foam. In an air in water foam, the water is the polar environment and the air is the non polar. Foams are usually stabilised by emulsifiers acting as amphiphiles. However in a gypsum or Portland cement foam there are three phases present, gaseous which is the air bubbles, the liquid or aqueous phase and the solid suspended particles of the hydraulic binder. The system can become unstable as cations are attracted into the region of the dispersed phase. When air bubbles touch, they coalesce and the foam collapses. The stronger the force separating the air bubbles, the more stable the foam. Foam stability can be achieved by ionic repulsion which depends upon the relative negative charges between the bubbles and which is influenced by the hydrophilic/lipophilic property of the surfactant or emulsifier when used. The surfactant is more concentrated in the interfacial region than in the bulk solution phase of the system. The amphiphilic nature of the surfactant is that the lipophilic or hydrophobic part of the molecule prefers to be in the lipid, non polar environment i.e. the air and the hydrophilic part preferring to be in the aqueous or polar environment.

A further form of foam stabilisation is steric hindrance which is relatively independent of ionic strength. It is believed that this may take two forms, either in an immobilised water layer at the interface or a solid interfacial film. It is emulsion stabilisation by proteins or gums or polyoxethylenes that rely on the first mechanism. In the case of proteins, their stabilisation of foam is as a function of the convoluted molecular physical structure. Hydrophobic parts of the stabiliser adsorb at the air inter face while hydrophilic segments are hydrated and form an immobilised layer. For example the controlled heat denaturation of a protein such as oxblood haemaglobin is said to expose hydrophobic regions of the polypeptide chain, resulting in amphiphylic properties that improve the emulsification characteristics. Stabilisation is achieved by the balance between a electrostatic repulsion and van der Waals attraction.

For example the aqueous foam 22 is blended with the slurry 32 into which has been dispersed a compound 42 in the form of a refined vegetable oil such as sunflower, canola, soybean or linseed, an equal or greater mass of a solvent, such as toluene, which is methylbenzene, in which the resonating double bonds seem to stabilise the oil and allow its easy dispersion in the continuous phase which is water. The compound 42 preferably contains a small percentage i.e. 0.5 to 2.5% of polyvinyl alcohol of the same or similar specification to that used as the foaming agent, and suspended particles of the binder 38, which has a high calcium proportion. When mixed under shear with the slurry 32, the oil or non polar triglycerides surround the non polar phase to which it has affinity. The non polar phase is air and the dispersed oil prevents coalescence by steric hindrance. This results in an intermediate product 12 of immense stability and a very fine cell size. Steric Hinderance is a term intended to denote the influence exerted on a reacting group by the spacial arrangement of neighbouring atoms. In this context, "reacting" may be physical or chemical.

The solvent can be used on its own to enhance the properties of the intermediate product 12 or to dissolve one of the relevant additives 24. In most cases the solvent is removed from the intermediate product 12 during drying.

The reinforcing members 44 are in this example in the form of an inorganic fibre in fibrous loose spun non-woven wool form comprising of filament lengths from 3 mm to 40 mm and in diameters in the range of 4 to 8 micron. The reinforcing members 44 are added in the range of 7 to 35% by mass of the mass of the binder 38 and is chosen from any one or any combination of rock wool, slag wool, mineral wool and glass wool.

Rock wool has an average diameter of 5 to 5.6 microns, is a dibasic rock and is non-combustible.

The extender 48 or filler is introduced in the blender 30 in order to provide a lightweight intermediate product 12.

The extender 48 can be in the form of hollow glass or siliceous micro cells or balloons. Some of these are synthetic or expanded Pertlite, others are bi-products such as high silica fractions of micronised coal burnt in power stations which are recovered. Examples are Cenolite by Ash Resources of South Africa or Fillite of Runcorn in Kent, UK. However a preferred extender 48 is a refined mineral by Silbrico Corporation called Sil-Cell which is a glass micro cellular filler comprising of hollow glass particles whose shapes vary to combine different geometries, both spherical and irregular. These shapes present the advantage of not only low final product 10 density but reinforcement and impact resistance. Due to the irregular shape of the particles greater tensile strength is derived and a mechanical key in packing occurs during the pressing operation. Each particle consists of multiple minute cells of micro bubbles and the effective specific gravity is in the range 0.18 or 180 kg/m³. The properties of the material are as follows:

| CHEMICAL PROPERTIES | |
|---|---|
| Silicon Dioxide | 73% |
| Aluminum Oxide | 17% |
| Potassium Oxide | 5% |
| Sodium Oxide | 3% |
| Calcium Oxide | 1% |
| Plus Trace Elements | |

| GRADES | Sil-32 | Sil-42 | Sil-35 | Sil-43 |
|---|---|---|---|---|
| Oil Absorption ASTM-D-1483 gms. Oil per 100 cc | 30 | 36 | 38 | 40 |
| Hygroscopic Moisture | 0 | 0 | 0 | 0 |
| Surface pH | 7.0 | 7.0 | 7.0 | 7.0 |
| Thermal Conductivity | 0.36 | 0.40 | 0.41 | 0.43 |
| Color | White | White | White | White |
| Dry Bulk Density, lb/cu. ft. | 7.0 | 8.5 | 9.0 | 10.5 |
| Average Particle Size, Microns | 75 | 45 | 40 | 35 |
| Effective Particle Density, lb./cu. Ft. (g/cm³) | 11.2 (0.18) | 15.6 (0.25) | 15.6 (0.25) | 18.7 (0.30) |
| Particle Size Range, Microns | 1-300 | 1-210 | 1-150 | 1-150 |
| Fusion Point (F.) | 2300 | 2300 | 2300 | 2300 |

Typical Particle Size Distribution

| (U.S. Sieve) % Wt. | Sil-32 | Sil-42 | Sil-35 | Sil-43 |
|---|---|---|---|---|
| +50 Mesh | 2 | Trace | 0 | 0 |
| −50 + 100 | 15 | 5 | Trace | Trace |
| −100 + 200 | 33 | 25 | 12 | 5 |
| −200 | 50 | 70 | 88 | 95 |

Another suitable extender 48 is expanded Perlite. Perlite refers to a siliceous rock, this is a form of volcanic glass which when heated to approximately 800° C. or more expansion occurs due to the release of water inside the semi-molten rock. If the expansion is done carefully a closed cell results at a density as low as 90 kg/m³, the diameter depends on the particle size before it is expanded. If the rock is milled to a small enough particle size, then it is possible to produce the expanded version in particle sizes appropriate for the method of the invention i.e. 200 microns or smaller. Properties of Perlite are as follows:

| Typical Chemical Analysis* | |
|---|---|
| Silicon | 33.8 |
| Aluminum | 7.2 |
| Potassium | 3.5 |
| Sodium | 3.4 |
| Iron | 0.6 |
| Calcium | 0.6 |
| Magnesium | 0.2 |
| Traces | 0.2 |
| Oxygen (by difference) | 47.5 |
| Net total | 97.0 |
| Bound Water | 3.0 |
| Total, % | 100.0 |

*All analysis are shown in elemental form.

| Typical Product Data | |
|---|---|
| Color | White |
| G.E. Brightness, % | 70-80 |
| Refractive Index | 1.47 |
| Specific Gravity | 2.2-.2.4 |
| Apparent or Bulk Density, lb/ft³ | 5-15 |
| gm/cc | .08-.24 |
| pH | Neural |
| Oil Absorption | 120-240* |
| Softening Point, ° F. | 1800 |
| ° C. | 980 |
| Moisture, % | <1.0 |
| Water Absorption | 195-350* |
| Ignition Loss, 3 hr 1700° F. (930 C.) | 1.5% max** |
| Mean Particle Diameter, Microns | As small as 10*** |

*lbs (kgs) oil or water/100 lbs (kgs)
**Due to residual combined water
***Varies with product Further lightweight particles suitable to act as extenders 48 for controlling density of the intermediate and final products 12, 10 is exfoliated vermiculite that may or may not at first have been sprayed with a hydrophobic agent such as a Siloxane in order to assist with the control of water to finder ratio. Grades particularly suitable are DDM by Palaborwa Mining Company of a particle size of 300 n micron or smaller or alternatively micron with a particle size of 500 micron or lower after exfoliation.

By granulating the intermediate product 12 which includes an appropriate extender 48 in a mechanical process in step 70 a lightweight granular filler is produced with a granular size range of 0.5 mm to 25 mm and more preferably in the size range 1 mm to 6 mm. The bulk density of the final product 10 filler preferably ranges from 200 to 400 kg/m$^3$.

Plasticisers 52 reduce the water 16, 40 to binder 38 ratio, propagate rapid hydration, early strength development cohesiveness, minimise bleed and help to compatibilise the binder 38. New super plasticiser powders based on polycarboxylic ethers such as VP2651 by SKW Polymers, a division of Degussa are examples were the molecules absorb away from each other because of steric repulsion between flexible side chains giving free access to cement particles by water propagating hydration.

Rapid hydration in the method of the invention is an advantage and in the best interest of production speeds. Retarders 50 or accelerators 26 for the binder 38 can also be added. This is particularly true were a gypsum Portland blend together with Pozzolan is produced.

A gelling agent 54 which increases the viscosity or cause the partial or complete gelling or precipitation of the foaming agent 14 is key to the method of the invention. The regularly arranged hydroxyl groups of the polyvinyl alcohol chain can form chemically more or less stable complex compounds or associates with certain substances. In addition, when the polyvinyl alcohol gels, it looses all tack and becomes non sticky. In addition, the gelled polyvinyl alcohol envelops the other components of the intermediate product 12 such as the binder 38 and extenders 48 as an integral part of the gel giving it considerable cohesive properties and allowing a formed sheet of the intermediate product 12 to be draped or formed in step 70 in such a way that no breakage, friability, parting or fissures result when handled reasonably, as would be the case in production.

The classic complex formed from polyvinyl alcohol is its reaction with boric acid or one of the borates. Boric acid gives the monodiol complex which in turn forms as a poly-electrolyte, the didiol complex.

The gelation particularly suitable to the method of the invention is the precipitation of polyvinyl alcohol by borax in solution which is $Na_2B_4O_5(OH)_4.8H_2O$ referred to as disodium tetraborate decahydrate. Borax partially hydrolyses to boric acid and this acts as a buffered gelling agent 54. In the method of the invention borax is dissolved in water to give a solution concentration of 1 to 8% by mass, more preferably in the range 2 to 5%. This solution, when blended in the blender 30 with the polyvinyl alcohol containing foam 22 is used in the range 1 to 5% of borax by mass on the mass of the foaming agent 14, more preferably in the range 1.5 to 3%.

Other possible gelling agents 54 are the elements of subgroups 1V to V1 of the periodic table. In some of these cases the complex which forms can be thermally fixed to give a polyvinyl alcohol insoluble film. An example is titanium-1V-triethanolamine complex which with polyvinyl alcohol solutions produces a highly viscous to gelling, titanium-1V complex. Titanium sulphate also reacts in a similar manner. Titanium 111, vanadium and chromium compounds cause gelling. Certain direct dyes, for example Congo red, produce gels. Organic compounds can produce gels, not always as powerfully as Congo red. Examples are the polyvalent phenols and related compounds such as resorcinol, Gallic and salicylic anhilide. Acetalyzation of polyvinyl alcohol such as with formaldehyde and acid, which acts as a catalyst, can also cause thickening or gelling. The acetalyzation reaction in Portland cement however, is reversed in the presence of calcium hydroxide.

The preferred gelling agent 54 on the grounds of performance is borax which results in precipitation.

The thermoplastic polymer emulsions 56 assist in imposing waterproofness and superior toughness to the final product 10 with improvements to both tensile and flexural strengths.

Thermoplastic polymer dispersions in water as a result of the emulsions 56 in the intermediate product 12 contribute many other desired properties. These include resistance to ultra violet light and water, contribution of strength, impact resistance and toughness. Some of these polymers have considerable coalesced flexibility. These polymer dispersions are characterized by a solid percentage in water of between 40 and 70% more generally in the range 50 to 65%. These polymers are typically addition polymers of ethylenically unsaturated monomers and include vinyl polymers and polymers of acrylates and methacrylates. Examples of polymerized monomers can include methyl acrylate, butyl acrylate, ethyl acrylate, methyl methacrylate, ethyl methacrylate, butyl methacrylate, hexyl methacrylate and lauryl methacrylate. Other monomers which can be used are styrene, vinyl acetate, vinyl versatate and vinyl chloride. Co-polymers of two or more of these monomers can be employed as desired depending on the properties that is required in the final composition. The term co-polymer is intended to include polymer blends as well as true co-polymers. The polymer can be an emulsion polymer. Preferred are co-polymers formed by emulsion polymerization. Monomers or monomer blends are selected for their special properties. For example polymerized styrene is alkali resistant and water resistant, but has doubtful long term aging properties.

Acrylate and methacrylate polymers have good long term aging properties in good water and alkali resistance. Synthetic latex polymers also have contributive properties. For example styrene/butadiene co-polymer latexes such as Savinex 29Y40 by the Synthetics Latex Company imposes special water resistant properties and improves toughness and resistance to impact.

Another property to be considered in the choice of polymer is the glass transition temperature or Tg's. This very generally speaking is approximately ⅔ of the melt point of the polymer. The higher the degree of crystallinity, generally the higher the glass transition temperature which is the temperature at which the polymer first softens and becomes rubbery or malleable. The glass transition temperature also affects the behavior of the polymer at low temperatures at which excessive brittleness is to be avoided. Tg's in the range 0 to 50° C. are frequently used.

The emulsions 56 are used in applications where polyvinyl alcohol is used as binder 38. The emulsions 56 can be a coalescing thermosetting polymer such as an acrylate or vinyl acetate or a styrene butadiene co-polymer latex in order to derive the desired properties chosen from rigidity, water resistance, resistance to impact, abrasion or wear and the optimization of cost.

Any appropriate coupler 58 or cross linker can be added to the blender 30.

In applications of the intermediate product 12 where the intermediate product 12 is sprayed onto structural components such as steel as a fire protection coating an adhesive should be deposited onto the structural elements before application of the intermediate product 12.

An example of an appropriate adhesive is Rovace 117 by Rohm & Haas which is a vinyl acetate homopolymer emulsion specifically for providing a bond coat between the intermediate product 12 and the metal. The typical properties of this low viscosity polyvinyl alcohol stabilised vinyl acetate homopolymer emulsion is as follows:

| ROHM & HAAS - ROVACE 117 TYPICAL PHYSICAL PROPERTIES The following properties should not be considered specifications. | |
|---|---|
| Solid content: | 55.0% |
| pH @ 25° C.: | 4.5 |
| Viscosity @ 25° C.: Brookfield, LVF 1,350 cPs: | 95 KU |
| Emulsion type: | Nonionic |
| Tg (DSC onseet): | +30.0° C. |
| MFFT: | +15.0° C. |
| Specific Gravity @ 25° C.: | 1.1 |
| MATERIAL | PARTS BY WEIGHT |
| ROVACE 117 (55.0%) | 86.0 |
| Santicizer 160 | 5.0 |
| Ethylene Glycol | 1.5 |
| Water | 7.5 |
| TOTAL | 100.00 |
| FORMULATION PARAMETERS | |
| Total Solids | 52.3% |
| Viscosity @ 25° C. (Brookfield, LVF) | 425 cPs |
| pH | 4.5 |
| MFFT | 7.0° C. |

EXAMPLE 1

As an example of the method 8, 9600 parts by weight of the beta-hemihydrate of calcium sulphate is blended with 640 parts by weight of sunflower oil as organic compound 42, 640 parts by weight of toluene acting as an aromatic disperser and solvent, 4800 parts by weight of a 2% solution of Mowiol 18/88 polyvinyl alcohol in water 40 and 45 parts by weight of Masterworks M1 by Rohm & Haas which is a polyamide base as retarder 50.

1000 g of hard wood bleached fibre of an average fibre length of 2 mm is used as reinforcing members 44 and is first slushed with water 40 whereafter excess water is extracted by compression giving a wet fibre additive made up of hard wood dry pulp fibre at 15 to 25% by mass and water at 75 to 85% by mass. All of the liquid components are first mixed in the vessel 36 and then the binder 38 is added to make the slurry 32.

As the foaming agent a 5% solution of polyvinyl alcohol 18/88 by Clariant is used which together with water, is pumped into the sparge unit 18. For every 3200 parts by weight of the 5% solution of polyvinyl alcohol in water 16, 90 parts by weight Masterworks M2 by Rohm & Haas is added as an accelerator 26.

Concurrently with the polyvinyl alcohol solution entering into the sparge unit 18, compressed air 20 is injected into the sparge unit 18 at a pressure of between 4 and 12 bar and in controlled volume.

The resulting foam 22 is delivered under the same pressure from the sparge unit 18 into the blender 30 with the volume being controlled by the hydraulic pressure in the line together with the pumping speed of the first pump 28.

The slurry 32 is pumped from the vessel 36 into the blender 30 by the second pump 34. The slurry 32 is retarded by which is meant hydration is impeded completely.

The foam 22 at a density of between 40 and 60 g/l and also containing the accelerator 26 is blended in the slurry 32 in the blender 30 and rises as a function of feed pressure from the first lower inlet 92 to the outlet 96. The shaft 100 revolves at between 750 and 2000 rpm and preferably at 1300 rpm. In this process the particle size of the binder 38 is sheared to the optimum particle size, for strength.

The foamed, intermediate product 12 which exits the blender 30 should set within ten minutes and this set time can be controlled by the relevant proportions of accelerator 26 and retarder 50. The intermediate product 12 has minute bubbles caused by elongation of the air cells and their constant truncating to produce a stable foam. The subsequent dry density of the final product 10 can be varied from 85 kg/m$^3$ to 900 kg/m$^3$ by proportioning the foam 22 to the slurry 32.

As gelling agent 54, 6 grams of a 1% solution of borax in water is dosed into the blender 30 near the top of the blender through the intermediate inlet 98, per every 10 g of foaming agent 14 by mass. The intermediate product 12 converts into a self pumpable or sprayable gel.

Depending on requirements the intermediate product 12 is dispensed onto a belt which may be microporous to assist drying from both sides for the manufacture of thermal insulation slabs typically at 100 kg/m$^3$ or for acoustic ceiling tiles at 300 kg/m$^3$ or for fire cores for doors and walls at 450 kg/m$^3$.

In an alternative method for producing the final product 10 an additional binder 202, polyvinyl alcohol 204 and water 206 are used to form an aqueous composition 200. Any of the appropriate additives 24 can be added to the aqueous composition 200.

The aqueous composition 200 replaces the aqueous foam 22 in the intermediate product 12. The additional binder 202 is similar to the binder 38 and the polyvinyl alcohol 24 is of the kind previously described in respect of the foaming agent 14.

The aqueous composition 200 is fed into the blender 30 in the same manner as the foam 22 and is mixed with the slurry 32 to produce an unfoamed intermediate binder product 12 which is processed in the manner described to produce a final product 10.

If required the unfoamed intermediate product 12 is foamed by reacting an acid or acid precursor with a carbon dioxide donor. An example of an appropriate acid precursor is a diacid ester.

As an example of this alternative process the following components are blended to form the aqueous composition 200:

Rapid hardening Portland cement which is added to the aqueous composition 200 as additional binder 202 at 1750 parts by weight;

Flyash as extender 48 of a particle size spectrum 5 to 45 microns at 750 parts by weight;

Sand as extender 48 of a fine particle size spectrum 40 mesh to 300 mesh at 2500 parts by weight;

5% solution of Mowiol 18/88 polyvinyl alcohol 204 at 2500 parts by weight; and

Polyamide 6 mm reinforcing fibre members 44 at 30 parts by weight.

The slurry 32 comprises of:

Portland cement as binder 38 at 75 parts by weight;

Flyash as extender 48 of a particle size spectrum 40 to 45 at 75 parts by weight; and A 4% solution of borax in water as gelling agent 54 at 70 parts by weight.

The aqueous composition 200 and the slurry 32 are blended in the blender 30 to produce an intermediate product 12 which is continuously processed in any one of a calender press, a roll cure press or an extrusion press which is alternatively followed by pressing in a continuous press or alternatively in a continuous press only to produce flat sheets.

The gelation of the polyvinyl alcohol 204 also allows the extrusion of shapes such as pipes, siding or mouldings.

The intermediate product and final product 12, 10 of the method 8 can be used for various applications depending on the specific composition thereof. For example the intermediate product 12 can be sprayed onto earthworks to bind and harden loose earth or can be sprayed onto combustible particles or onto structural elements to act as a fire retardant. The final product 10 can for example be used as acoustic tiles, ceiling boards, fireproof panelling, piping, cornices and many more.

The addition of the gelling agent 54 to the foamed or unfoamed intermediate binder product 12 and final product 10 improves handling and productivity of the intermediate product 12 and final product 10. By adding the gelling agent 54 to the intermediate product 12 the intermediate product 12 is rendered tack-free or non-sticky. This allows the intermediate product 12 to be rolled, extruded or pressed without adhering to equipment. The gelled or partly gelled polyvinyl alcohol holds the intermediate product 12 together cohesively and prevents parting, splitting, separation or friability during process. When the intermediate product 12 is foamed the gelled or partly gelled polyvinyl alcohol prevents air bubble coalescence and minimises air bubble size.

The invention claimed is:

1. A method of manufacturing a hydraulic binder product which includes the steps of:
   (i) introducing an unfoamed aqueous polyvinyl alcohol solution, comprising 2% to 10% by weight of a fully hydrolyzed polyvinyl alcohol with a degree of hydrolysis of 97% to 99.5% and a molecular weight of 105 000 and 175 000 g/mol, which aqueous polyvinyl alcohol solution does not having a gelling agent that is capable of chemically reacting and forming an association in the form of a complex compound with the polyvinyl alcohol, into a blender;
   (ii) introducing a hydraulic binder into the blender and hydrating the hydraulic binder such that a mixture of the hydraulic binder and the polyvinyl alcohol solution is obtained in which the polyvinyl alcohol solution is present in a concentration of between 4% and 20% in water;
   (iii) introducing a gelling agent, capable of chemically reacting and forming an association in the form of a complex compound with the polyvinyl alcohol in the aqueous polyvinyl alcohol solution, into the blender separately from the aqueous polyvinyl alcohol solution, with the gelling agent reacting with the polyvinyl alcohol in the polyvinyl alcohol solution and thereby causing the polyvinyl alcohol to gel cohesively such that its viscosity increases and it thereby envelops the hydraulic binder;
   (iv) shearing the gelled polyvinyl alcohol enveloping the hydraulic binder in the blender through mixing with the gelled polyvinyl alcohol enveloping the binder product becoming granulated in a form in which it has lost substantially all tack and is non-sticky, thereby to obtain an unprocessed hydraulic binder product; and
   (v) processing the unprocessed hydraulic binder product by any one or more of pressing, rolling and extruding, thereby to obtain a processed hydraulic binder product.

2. A method of manufacturing according to claim 1 wherein the aqueous polyvinyl alcohol solution includes an additional hydraulic binder.

3. A method of manufacturing according to claim 1 wherein the blender has a sealed body with a first inlet, a second inlet, an outlet, a central shaft into the body, a plurality of spaced apart agitators which extend radially from the shaft, and a plurality of blade formations which extend from the body between the agitators.

4. A method of manufacturing according to claim 1 which includes admixing with the polyvinyl alcohol and the hydraulic binder any one or more of a solvent, reinforcing members, a plasticizer, an extender, a retarder, an accelerator, a thermoplastic polymer emulsion and an organic component.

5. A method of manufacturing according to claim 1 wherein the gelling agent is selected from any one or combination of a borate gelling agent, borax, manganese, and complex or association-forming elements of groups IV to VI of the Periodic Table of Elements.

6. A method of manufacturing according to claim 2, wherein the additional hydraulic binder is the same as the hydraulic binder of the hydraulic binder slurry.

7. A method of manufacturing according to claim 1, wherein the hydraulic binder is selected from Portland cement, calcium sulphate hemihydrates, and calcium aluminates.

8. A method of manufacturing according to claim 1, which includes admixing pulp fibre with the hydraulic binder and the polyvinyl alcohol.

9. A method of manufacturing according to claim 1, in which the hydraulic binder is introduced into the blender in the form of a hydraulic binder slurry.

10. A method according to claim 5, in which the gelling agent is borax, being employed as a 1% to 8% by mass solution of borax in water, and being introduced into the blender so as to establish a concentration of borax, on a dry basis, of 1% to 5% by mass of the polyvinyl alcohol in the polyvinyl alcohol solution.

\* \* \* \* \*